US006092162A

United States Patent [19]
Chiang

[11] Patent Number: 6,092,162
[45] Date of Patent: Jul. 18, 2000

[54] REGISTER ACCESS CONTROLLER FOR PREVENTING LIVE-LOCK FROM A REQUEST FOR ACCESSING A REGISTER

[75] Inventor: John M. Chiang, San Jose, Calif.

[73] Assignee: Advanced Micro Devices, Inc., Sunnyvale, Calif.

[21] Appl. No.: 08/994,618

[22] Filed: Dec. 19, 1997

[51] Int. Cl.[7] .................................................. G06F 12/14
[52] U.S. Cl. ........................ 711/163; 711/103; 711/172; 714/53
[58] Field of Search .................................. 711/103, 172, 711/152; 4/163; 714/53

[56] References Cited

U.S. PATENT DOCUMENTS 5,471,601  11/1995  Gonzales ........................................ 711/3
5,974,456  10/1999  Naghshineh et al. ................... 709/223

Primary Examiner—Hiep T. Nguyen
Attorney, Agent, or Firm—Monica H. Choi

[57] ABSTRACT

A register access controller prevents the occurrence of a live-lock condition when an electronic device specifies a register for access from a plurality of registers. The register access controller uses a partial spectrum address decoder instead of a full spectrum address decoder for decoding a register address specifying an implemented register to utilize the advantages of a smaller and simpler decoding circuitry and a faster response of a partial spectrum address decoder. The register access controller also monitors when the specified register address does not correspond to any of the implemented registers to provide a proper response to the electronic device in order to prevent a live-lock condition. The present invention may be used to particular advantage when the plurality of registers and the register access controller are part of an Ethernet computer network peripheral device within a computer having a CPU (Central Processing Unit) which is the electronic device requesting access to the plurality of registers.

17 Claims, 3 Drawing Sheets

REGISTER ACCESS CONTROLLER FOR PREVENTING LIVE-LOCK FROM A REQUEST FOR ACCESSING A REGISTER

TECHNICAL FIELD

This invention relates to memory registers, and more particularly, to an apparatus and method for preventing occurrence of a live-lock condition when handling a request for accessing a register when a partial spectrum address decoder is used for decoding register addresses of implemented registers.

BACKGROUND OF THE INVENTION

Referring to FIG. 1, a register access controller 100 of the prior art controls the transfer of data between a register page 102 and a bus interface 104. In addition, data is also transferred between the bus interface 104 and an electronic device 106 accessing the page of registers 102. The register page 102 is comprised of a plurality of registers including a first register 111, a second register 112, a third register 113, and so on, up to an eighth register 118, and further so on, up to a sixty-fourth register 164.

In the register page 102, the first register 111 up to the eighth register 118 are implemented to store useful data. The rest of the registers (i.e., a ninth register up to the sixty-fourth register 164) are non-implemented but are included within the register page 102 in case of data processing expansion requiring more registers in the future.

Referring to FIG. 1, each register has a respective output driver coupled between that register and the bus interface 104. In FIG. 1, a first output driver 121 is coupled between the first register 111 and the bus interface 104, a second output driver 122 is coupled between the second register 112 and the bus interface 104, and so on, with an eighth output driver 128 being coupled between the eighth register 118 and the bus interface 104, and further so on, with a sixty-fourth output driver 166 being coupled between the sixty-fourth register 164 and the bus interface 104. (Note that the total number of registers and the total number of implemented registers are considerably larger for typical register pages, but eight implemented registers within the register page 102 having a total of 64 registers are shown in FIG. 1 for clarity of illustration.)

Each output driver turns on to couple the respective register corresponding to that output driver to the bus interface 104 or turns off to decouple the respective register to the bus interface 104. A 6-bit address line 170 indicates a selected register of the 64 registers of the register page 102 for being coupled to the bus interface 104. A full spectrum address decoder 172 decodes the data on the 6-bit address line 170 and generates a first control signal which turns on the respective output driver of the selected register. In FIG. 1, the first control signal may be a high state at an output line coupled to the respective output driver of the selected register and a low state at output lines coupled to the respective output driver of the rest of the plurality of registers of the register page 102.

The first register 111 through the eighth register 118 are implemented to contain useful data to be transferred between any of those implemented registers and the electronic device 106. On the other hand, the content of a non-implemented register (i.e. any of the ninth register through the sixty-fourth register 164) are not useful for data processing and is typically comprised of a predetermined bit pattern (such as a series of low bits, i.e., "0 0 0 . . . ") to indicate to the electronic device 106 that such a register is non-implemented.

Since the content of the implemented registers are useful, the full spectrum address decoder 172 which has circuitry to decode the full 6 bits for selecting any of all 64 registers is not necessary. Since only the first register 111 through the eighth register 118 are implemented, a simpler 3 bit partial spectrum address decoder is sufficient. Such a partial spectrum address decoder which decodes only 3 bits of the 6 bits may have a smaller and a simpler decoding circuitry and thus may provide decoding with a faster response time as is known to one of ordinary skill in the art of digital systems design.

Referring to FIG. 2, another register access controller 200 of the prior art includes such a partial spectrum address decoder 202. (Note that elements having the same reference number in FIGS. 1 and 2 refer to elements having similar structure and function.) This partial spectrum address decoder may decode only the 3 least significant bits of the 6 bits on the address line 170 for the eight implemented registers within the register page 102.

However, with the register access controller 200 of the prior art, if the 6 bits on the address line 170 specify a non-implemented register within the register page 102, then the bus interface 104 is not claimed by any of the registers. The electronic device 106 receives no response in that case. Such a condition is commonly referred to as a "live-lock condition," and may cause adverse effects within the electronic device 106. Yet, using the partial spectrum address decoder 202 instead of the full spectrum address decoder 172 of FIG. 1 is desirable because of the advantages of a smaller and simpler decoding circuitry and a quicker response time of a partial spectrum address decoder.

SUMMARY OF THE INVENTION

Accordingly, a primary object of the present invention is to use a partial spectrum address decoder when an address of an implemented register is specified for access while preventing occurrence of a live-lock condition when an address of a non-implemented register is specified.

In a general aspect of the present invention, a register access controller prevents the occurrence of a live-lock condition when handling a request for accessing a register from a plurality of registers by an electronic device. The register access controller includes an address line for carrying a register address of a selected register from the plurality of registers chosen by the electronic device for a transfer of data between the selected register and the electronic device. The register access controller further includes a partial spectrum address decoder, coupled to the address line, for decoding the register address on the address line to couple the selected register to the bus interface when the selected register corresponding to the register address is an implemented register. Furthermore, the register access controller includes a live-lock preventing unit, coupled to the partial spectrum address decoder, for detecting when the register address does not correspond to an implemented register to send a predetermined bit pattern to the bus interface. In this manner, a response is sent to the bus interface no matter whether the specified register is an implemented register or a non-implemented register, thus avoiding any live-lock condition even when using a partial spectrum address decoder.

The present invention may be used to particular advantage when the plurality of registers and the register access controller are part of an Ethernet computer network peripheral device within a computer having a CPU (Central Processing Unit) which is the electronic device, and when the bus interface is coupled between the Ethernet computer network peripheral device and the CPU of the computer, and when the CPU reads data from an implemented register in a slave mode.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference numeral in FIGS. 1–3 refer to elements having similar structure and function.

DETAILED DESCRIPTION

Figure 1:
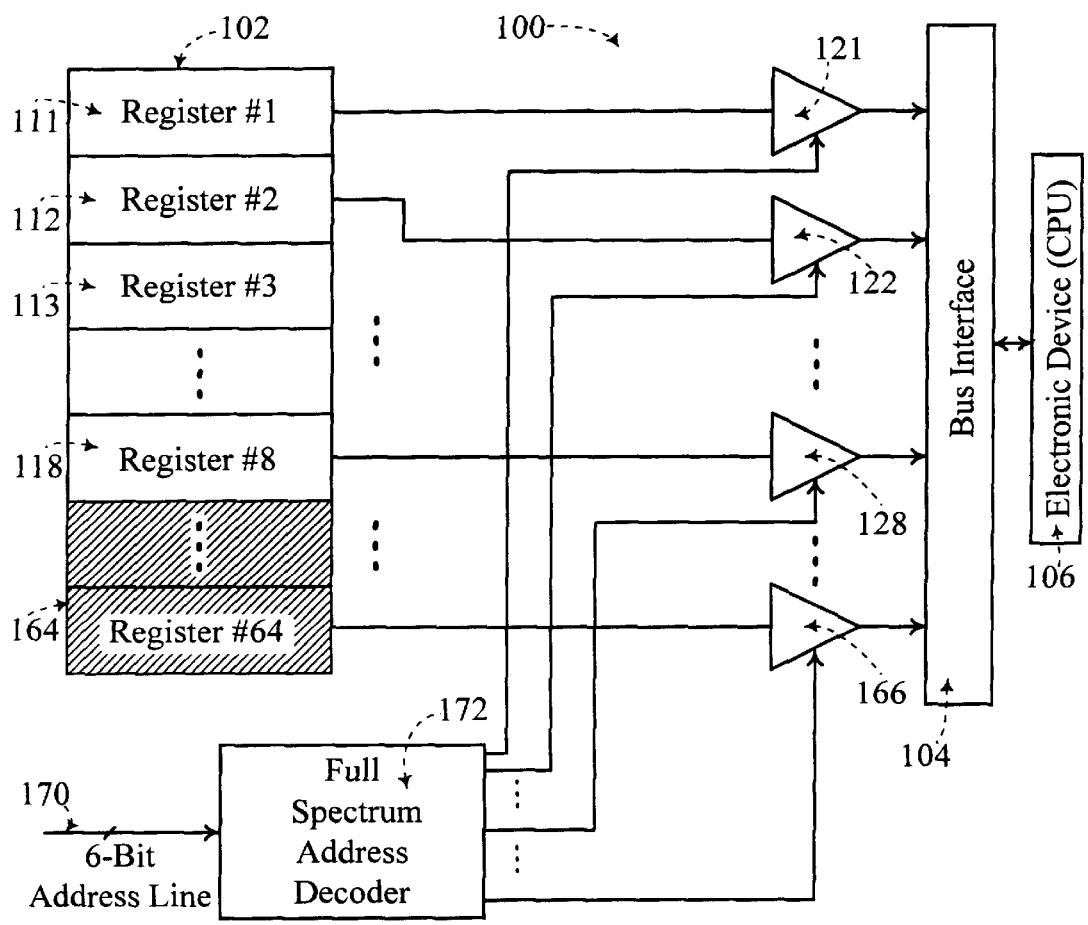
FIG. 1 shows a register access controller of the prior art which uses a full spectrum address decoder.
Figure 2:
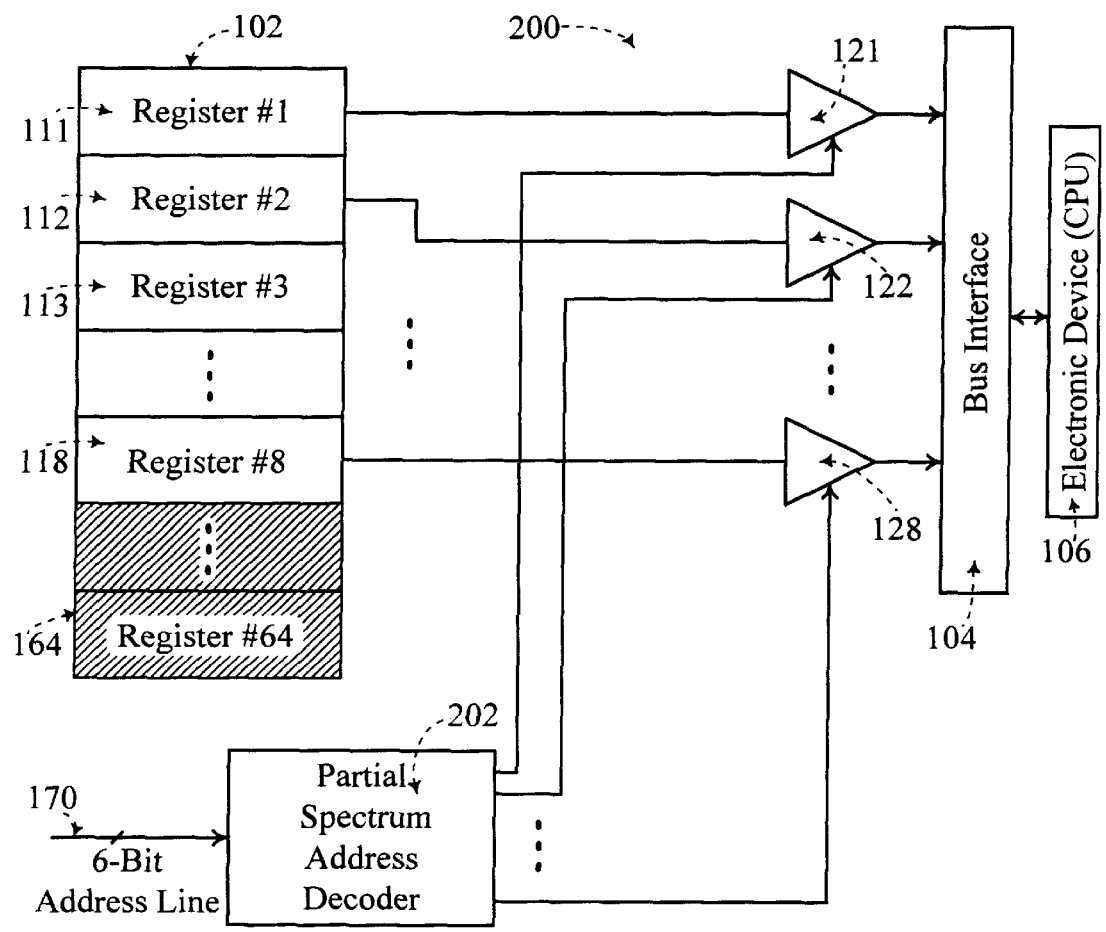
FIG. 2 shows a register access controller of the prior art which uses a partial spectrum address decoder but which may be prone to a live-lock condition.
Figure 3:
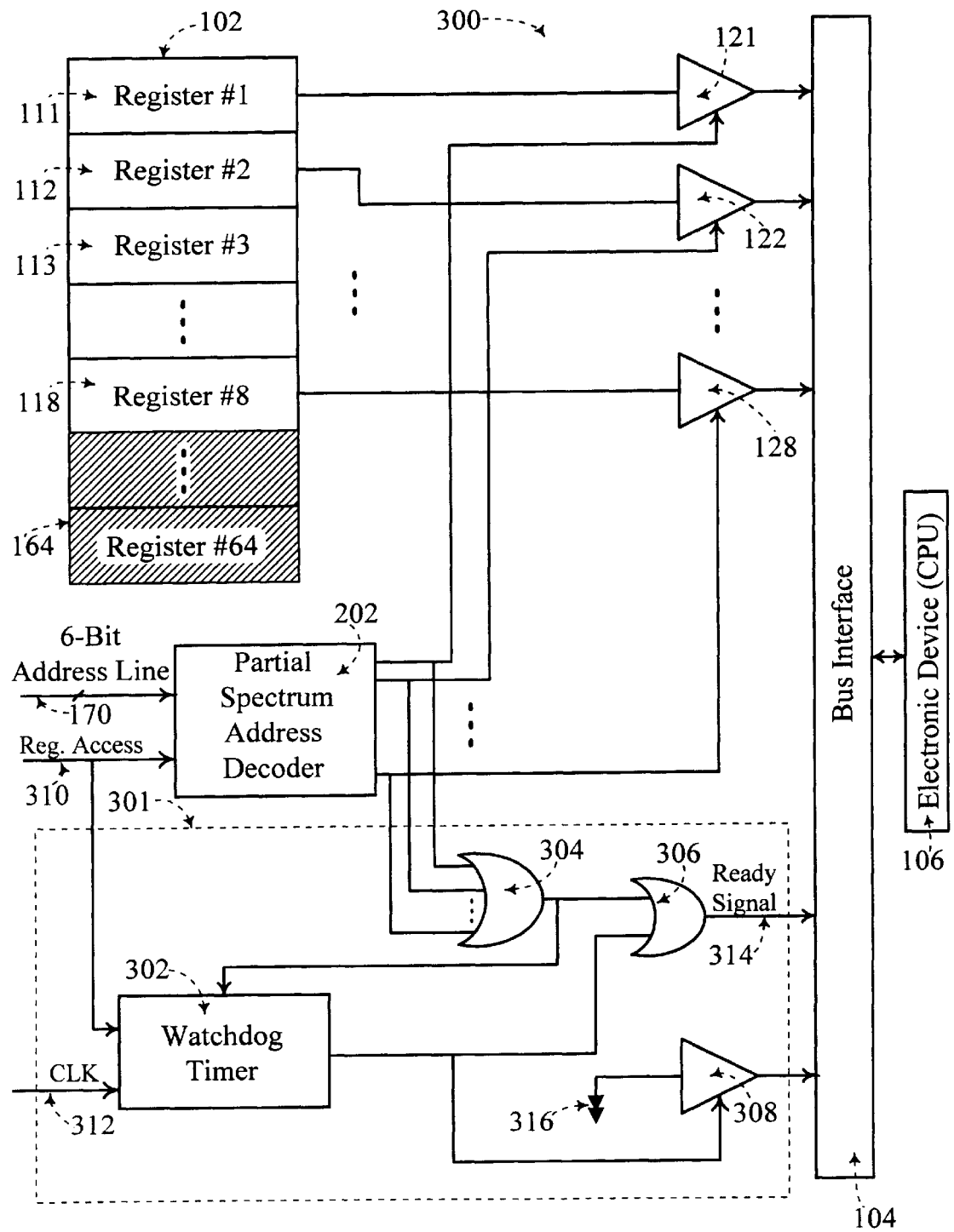
FIG. 3 shows a register access controller which uses a partial spectrum address decoder and which also prevents any live-lock condition, according to a preferred embodiment of the present invention.

Referring to FIG. 3, a register access controller 300 of the present invention includes additional components to the prior art register access controller 200 of FIG. 2. (Elements having the same reference number in FIGS. 2 and 3 refer to elements having similar structure and function.) The register access controller 300 of FIG. 3 includes a live-lock preventing unit 301 (shown within dashed lines) for preventing occurrence of a live-lock condition.

The live-lock preventing unit 301 includes a watchdog timer 302 and a first OR gate 304 having as inputs, output lines from the partial spectrum address decoder 202. The output of the first OR gate 304 is an input to a second OR gate 306 of the live-lock preventing unit 301 and also controls the watchdog timer 302. The output of the watchdog timer 302 is another input to the second OR gate 306 and controls a non-implemented register output driver 308 of the live-lock preventing unit 301.

The operation of the register access controller 300 of the present invention is now described. A register access input 310 indicates when the 6-bit register address on the address line 170 changes. The 6-bit register address specifies a selected register of the plurality of registers of the register page 102. The partial spectrum address decoder 202 decodes the 6-bit register address on the address line 170 when the corresponding selected register is an implemented register within the register page 102 (i.e., the first register 111 through the eighth register 118 in FIG. 3). A corresponding output line for the selected register from the partial spectrum address decoder 202 changes to a high state to turn on a corresponding output driver to couple the selected register to the bus interface 104. On the other hand, in the case the selected register is a non-implemented register, none of the output lines from the partial spectrum address decoder 202 turns to a high state.

The first OR gate 304 in conjunction with the watchdog timer 302 determines whether the selected register is an implemented register or a non-implemented register. Since the output lines from the partial spectrum address decoder 202 are inputs to the first OR gate 304, the output of the first OR gate also turns high if the selected register is an implemented register. On the other hand, the output of the first OR gate remains low if the selected register is a non-implemented register since none of the output lines from the partial spectrum address decoder 202 turns to a high state in that case.

The watchdog timer 302 monitors the output of the first OR gate 304 from when the register access input 310 indicates a change to the 6-bit register address on the address line 170 to the end of a predetermined number of clock periods at a clock signal input 312. This predetermined number of clock periods is the time period that is sufficient for the partial spectrum address decoder 202 to completely decode the 6-bit register address on the address line 170.

In the case the watchdog timer 302 detects a high state at the output of the first OR gate 304 after such a predetermined number of clock periods, then the selected register is determined by the watchdog timer 302 to be an implemented register. In that case, a respective output driver corresponding to the selected register couples the selected register to the bus interface, and a live-lock condition does not occur.

In the case the watchdog timer 302 detects a low state at the output of the first OR gate 304 after such a predetermined number of clock periods, then the selected register is determined by the watchdog timer 302 to be a non-implemented register. In that case, the 6-bit register address on the address line 170 does not correspond to a register address of the implemented registers (i.e., the first through the eighth registers 111–118).

Further in that case, to prevent occurrence of a live-lock condition, the watchdog timer 302 sends a ready signal on a ready signal output 314 to the electronic device 106 via the bus interface 104. In addition, the watchdog timer 302 controls the non-implemented register output driver 308 to send a predetermined pattern of bits (such as a series of low bits, i.e. "0 0 0 . . . " for example) on the bus interface 104. Thus, the non-implemented output driver 308 is coupled to a low potential 316. The watchdog timer 302 may be a PLU (Programmable Logic Unit) or any other typical data processing unit which may be programmed to carry out such functions by one of ordinary skill in the art of digital systems design.

The ready signal on the ready signal output 314 indicates that the electronic device 106 may read the data on the bus interface 104 even when a non-implemented register is specified by the 6 bit register address on the address line 170. The predetermined pattern of bits sent by the non-implemented register output driver 308 indicates to the electronic device 106 that the specified register is a non-implemented register. Thus, the electronic device 106 still receives a response even when a specified register is a non-implemented register, and a live-lock condition is avoided.

An example application which uses such a transfer of data from a register page to a bus interface is an Ethernet computer network peripheral device installed within a computer to interface that computer to a network of computers. In that example, the register page 102 with the register access controller 100 is part of the Ethernet computer network peripheral device. Also in that example, the bus interface 104 is a bus interface between the Ethernet computer network peripheral device and a CPU of the computer in which the Ethernet computer network peripheral device is installed. The CPU is an example electronic device that reads the data on the bus interface 104 in accessing the contents of the register page 102.

In that example, each implemented register in the register page 102 may include data packets and other types of data received by the Ethernet computer network peripheral device from the network of computers. The CPU of the computer in which the Ethernet computer network peripheral device is installed reads the data from the implemented registers within the register page 102 in a mode commonly termed "the slave mode" to further process such data.

In this manner, the register access controller 300 of the present invention uses a partial spectrum address decoder instead of a full spectrum address decoder when only a part of a register page is implemented for the advantages of a smaller and simpler decoding circuitry and a faster response time of a partial spectrum address decoder. At the same time, the register access controller includes a watchdog timer within a live-lock preventing unit which prevents occurrence of a live-lock condition ensuring a proper response to the electronic device 106 no matter whether an implemented register or a non-implemented register is specified for access.

The foregoing is by way of example only and is not intended to be limiting. For example, the present invention may be implemented for any number of implemented registers and non-implemented registers located anywhere within a register page. In addition, the live-lock preventing unit 301 may be implemented in any other manner as is known to one of ordinary skill in the art. The invention is limited only as defined in the following claims and equivalents thereof.

I claim:

1. A register access controller that prevents live-lock during a request for accessing a register from a plurality of registers by an electronic device, the register access controller comprising:

an address line for carrying a register address of a selected register from the plurality of registers chosen by the electronic device for a transfer of data between the selected register and the electronic device;

a partial spectrum address decoder, coupled to the address line, for decoding the register address on the address line to couple the selected register to a bus interface, coupled to the electronic device, when the selected register corresponding to the register address is an implemented register; and a live-lock preventing unit, coupled to the partial spectrum address decoder, for detecting when the register address on the address line does not correspond to an implemented register so that said live-lock preventing unit sends a predetermined bit pattern to the bus interface when the register address on the address line does not correspond to an implemented register.

2. The register access controller of claim 1, wherein the live-lock preventing unit detects when the selected register is a non-implemented register so that said live-lock preventing unit sends a predetermined bit pattern to the bus interface when the selected register is a non-implemented register.

3. The register access controller of claim 2, further comprising:

a ready signal output, coupled to the partial spectrum address decoder, the live-lock preventing unit, and the bus interface, for sending a ready signal to the electronic device on the bus interface when the bus interface is ready for the transfer of data between the bus interface and the electronic device when the selected register is either one of an implemented register or a non-implemented register.

4. The register access controller of claim 2, wherein the predetermined bit pattern on the bus interface indicates to the electronic device that the selected register is a non-implemented register.

5. The register access controller of claim 2, wherein the partial spectrum address decoder includes a respective control line for each implemented register, and wherein the partial spectrum decoder outputs a high state at the respective control line corresponding to the selected register when the selected register is an implemented register, and wherein the live-lock preventing unit is coupled to each of the respective control lines from the partial spectrum address decoder to detect when the selected register is a non-implemented register by detecting no high state at any of the respective control lines for a predetermined number of clock periods after the register address changes.

6. The register access controller of claim 5, wherein each respective control line controls a respective output driver which couples a corresponding implemented register to the bus interface when the respective control line is in a high state.

7. The register access controller of claim 5, wherein the live-lock preventing unit further includes a non-implemented register output driver which outputs a series of low bits as the predetermined bit pattern when the selected register is a non-implemented register.

8. The register access controller of claim 2, wherein the plurality of registers and the register access controller are part of an Ethernet computer network peripheral device within a computer having a CPU (Central Processing Unit) which is the electronic device, and wherein the bus interface is coupled between the Ethernet computer network peripheral device and the CPU of the computer, and wherein the CPU reads data from an implemented register in a slave mode.

9. A register access controller for handling a request for accessing either one of an implemented register and a non-implemented register from a plurality of registers by an electronic device, the register access controller comprising:

an address line for carrying a register address of a selected register from the plurality of registers chosen by the electronic device for a transfer of data between the selected register and the electronic device;

a partial spectrum address decoder, coupled to the address line, for decoding the register address on the address line when the selected register corresponding to the register address is an implemented register;

means for determining whether the selected register is one of an implemented register and a non-implemented register;

means for coupling the selected register to a bus interface which is coupled to the electronic device when the selected register is an implemented register; and means for sending a predetermined bit pattern to the electronic device on the bus interface when the selected register is a non-implemented register.

10. The register access controller of claim 9, wherein the plurality of registers and the register access controller are part of an Ethernet computer network peripheral device within a computer having a CPU (Central Processing Unit) which is the electronic device, and wherein the bus interface is coupled between the Ethernet computer network peripheral device and the CPU of the computer, and wherein the CPU reads data from an implemented register in a slave mode.

11. A method for handling a request for accessing either one of an implemented register and a non-implemented register from a plurality of registers by an electronic device, the method including the steps of:

accepting a register address corresponding to a selected register of the plurality of registers chosen for a transfer of data between the selected register and the electronic device;

decoding, by a partial spectrum address decoder, the register address on the address line when the selected register in an implemented register;

determining, by a live-lock preventing unit coupled to the partial spectrum address decoder, whether the selected register is one of an implemented register and non-implemented register;

coupling the selected register to a bus interface which is coupled to the electronic device when the selected register is an implemented register; and sending a predetermined bit pattern to the electronic device on the bus interface when the selected register is a non-implemented register.

12. The method of claim 11, further including the step of:

sending a ready signal to the electronic device on the bus interface when the bus interface is ready for the transfer of data between the bus interface and the electronic device when the selected address register is either one of an implemented register and a non-implemented register.

13. The method of claim 11, wherein the predetermined bit pattern on the bus interface indicates to the electronic device that the selected register is a non-implemented register.

14. The method of claim 11, wherein the step of decoding includes a step of:

outputting a high state at a respective control line corresponding to the selected register when the selected register is an implemented register, and wherein the step of coupling the selected register to the bus interface includes the step of turning on a respective output driver which couples the selected register to the bus interface when the respective control line is in a high state.

15. The method of claim 14, and wherein the step of determining whether the selected register is one of an implemented register and a non-implemented register further includes a step of detecting when the selected register is a non-implemented register by detecting no high state at any of the respective control lines for a predetermined number of clock periods after the register address changes during the step of decoding the register address.

16. The method of claim 11, wherein the step of sending the predetermined bit pattern includes sending a series of low bits on the bus interface to the electronic device.

17. The method of claim 11, wherein the plurality of registers are part of an Ethernet computer network peripheral device within a computer having a CPU (Central Processing Unit) which is the electronic device, and wherein the bus interface is coupled between the Ethernet computer network peripheral device and the CPU of the computer, and wherein the CPU reads data from an implemented register in a slave mode.

* * * * *